US009888471B2

(12) United States Patent
Panteleev et al.

(10) Patent No.: US 9,888,471 B2
(45) Date of Patent: Feb. 6, 2018

(54) CONSTRUCTION OF TRANSMISSION PATTERNS FOR D2D COMMUNICATION

(71) Applicant: Intel Corporation, Santa Clara, CA (US)

(72) Inventors: Sergey Panteleev, Nizhny Novgorod (RU); Alexey Khoryaev, Nizhny Novgorod (RU); Debdeep Chatterjee, Mountian View, CA (US); Sergey Sosnin, Zavolzhie (RU)

(73) Assignee: Intel Corporation, Santa Clara, CA (US)

( * ) Notice: Subject to any disclaimer, the term of this patent is extended or adjusted under 35 U.S.C. 154(b) by 26 days.

(21) Appl. No.: 14/671,315

(22) Filed: Mar. 27, 2015

(65) Prior Publication Data

US 2016/0095112 A1 Mar. 31, 2016

Related U.S. Application Data

(60) Provisional application No. 62/055,581, filed on Sep. 25, 2014.

(51) Int. Cl.
| H04W 72/04 | (2009.01) |
| H04L 1/16 | (2006.01) |
| H04W 76/02 | (2009.01) |
| H04W 72/12 | (2009.01) |

(52) U.S. Cl.
CPC ....... *H04W 72/0446* (2013.01); *H04L 1/1614* (2013.01); *H04W 72/1289* (2013.01); *H04W 76/023* (2013.01)

(58) Field of Classification Search
CPC ............ H04W 72/0446; H04W 76/023; H04L 1/1615
See application file for complete search history.

(56) References Cited

U.S. PATENT DOCUMENTS

| 2014/0003262 A1 | 1/2014 | He et al. |
| 2015/0055567 A1* | 2/2015 | Narasimha .......... H04W 76/023 370/329 |
| 2015/0085719 A1* | 3/2015 | Yin ....................... H04L 1/1896 370/280 |

(Continued)

FOREIGN PATENT DOCUMENTS

| TW | 201429174 A | 7/2014 |
| WO | WO2012019348 A1 | 2/2012 |
| WO | 2013141546 A1 | 9/2013 |

OTHER PUBLICATIONS

International Search Report and Written Opinion for PCT/US2015/042075 dated Oct. 6, 2015; 14 pages.

(Continued)

*Primary Examiner* — Luat Phung
(74) *Attorney, Agent, or Firm* — Schwabe, Williamson & Wyatt, P.C.

(57) ABSTRACT

Embodiments of the present disclosure describe apparatuses and methods for selecting or extending time resource patterns relating to device-to-device (D2D) functionality. Various embodiments may include processing circuitry to select a subset of a predefined set of D2D time resource pattern bitmaps and generate a signal having information corresponding to the selected subset of D2D time resource pattern bitmaps. Other embodiments may be described and/or claimed.

22 Claims, 8 Drawing Sheets

(56) References Cited

U.S. PATENT DOCUMENTS

2015/0373694 A1* 12/2015 You .................. H04L 5/0051
370/329
2016/0044729 A1* 2/2016 Tu .................... H04W 74/04
370/329
2016/0205713 A1* 7/2016 Seo ................... H04W 72/121
370/280

OTHER PUBLICATIONS

Fujitsu, "eNB controlled resource allocation for D2D broadcast," Agenda Item 7.2.3.2.2; 3GPP TsSG-RAN1 #78; Dresden, Germany, Aug. 18-22, 2014; R1-142933; 5 pages.
LG Electronics, "UE Procedure in Mode 1 Communication," Agenda Item 7.2.3.2.2; 3GPP TSG RAN WGI Meeting #78; Dresden, Germany, Aug. 18-22, 2014; R1-143181; 5 pages.
Intel Corporation, "Resource Allocation for Mode-2 D2D Operation," Agenda Item 7.2.3.2.1; 3GPP TSG RAN WG1 Meeting #78; Dresden, Germany, Aug. 18-24, 2014; R1-142871; 10 pages.
Intel Corporation, "Resource Allocation for Mode-1 D2D Operation," Agenda Item 7.2.3.2.2; 3GPP TSG RAN WG1 Meeting #78; Dresden, Germany, Aug. 18-22, 2014; R1-142872; 7 pages.
Taiwan Office Action issued for Patent Application No. 104127171 dated Oct. 27, 2016; 22 pages.
Notification of Transmittal of International Preliminary Report on Patentability (IPRP) dated Oct. 20, 2016 for International Application No. PCT/US2015/042075.

\* cited by examiner

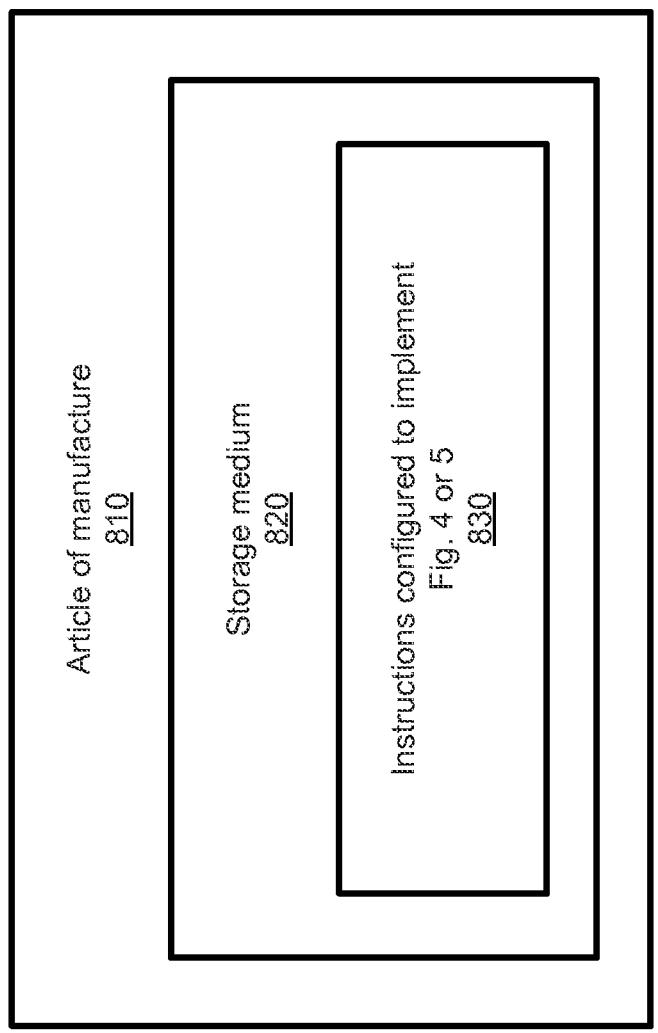

ized by reference in its entirety for all purposes, except for those sections, if any, that are inconsistent with this specification.

CONSTRUCTION OF TRANSMISSION PATTERNS FOR D2D COMMUNICATION

CROSS REFERENCE TO RELATED APPLICATIONS

The present application claims priority to U.S. Provisional Patent Application No. 62/055,581, filed Sep. 25, 2014, entitled "METHOD FOR CONSTRUCTION OF FLEXIBLE SET OF DATA TRANSMISSION PATTERNS FOR D2D COMMUNICATION," the entire disclosure of which is hereby incorporated by reference in its entirety for all purposes, except for those sections, if any, that are inconsistent with this specification.

FIELD

Embodiments of the present disclosure generally relate to the field of wireless communication, and more particularly, to apparatuses and methods for enabling device-to-device (D2D) functionality.

BACKGROUND

The background description provided herein is for generally presenting the context of the disclosure. Unless otherwise indicated herein, the materials described in this section are not prior art to the claims in this application and are not admitted to be prior art or suggestions of the prior art, by inclusion in this section.

D2D applications may provide a scalable and universal framework for connecting proximity peers. There are different technology solutions for D2D applications, e.g., based on WiFi Direct or Near Field Communication (NFC) technology. D2D functionality relating to the 3rd Generation Partnership Project (3GPP) may also be provided by Proximity Services (ProSe) or Long-Term Evolution (LTE) Direct.

The aforementioned standards may provide a wide range of configurability for User Equipment (UE) devices supporting such standards. For example, it may be possible to configure a UE into a discovery or relay mode.

BRIEF DESCRIPTION OF THE DRAWINGS

Embodiments will be readily understood by the following detailed description in conjunction with the accompanying drawings. To facilitate this description, like reference numerals designate like structural elements. Embodiments are illustrated by way of example and not by way of limitation in the figures of the accompanying drawings.

FIG. 8 illustrates an article of manufacture having programming instructions, incorporating aspects of the present disclosure, in accordance with various embodiments.

DETAILED DESCRIPTION

In the following detailed description, reference is made to the accompanying drawings, which form a part hereof wherein like numerals designate like parts throughout, and in which is shown by way of illustration embodiments that may be practiced. It is to be understood that other embodiments may be utilized and structural or logical changes may be made without departing from the scope of the present disclosure.

Various operations may be described as multiple discrete actions or operations in turn, in a manner that is most helpful in understanding the claimed subject matter. However, the order of description should not be construed as to imply that these operations are necessarily order dependent. In particular, these operations may not be performed in the order of presentation. Operations described may be performed in a different order than the described embodiment. Various additional operations may be performed and/or described operations may be omitted in additional embodiments.

For the purposes of the present disclosure, the phrase "A and/or B" means (A), (B), or (A and B). For the purposes of the present disclosure, the phrase "A, B, and/or C" means (A), (B), (C), (A and B), (A and C), (B and C), or (A, B, and C). The description may use the phrases "in an embodiment," or "in embodiments," which may each refer to one or more of the same or different embodiments. Furthermore, the terms "comprising," "including," "having," and the like, as used with respect to embodiments of the present disclosure, are synonymous.

As used herein, the term "circuitry" may refer to, be part of, or include an Application Specific Integrated Circuit (ASIC), an electronic circuit, a processor (shared, dedicated, or group), and/or memory (shared, dedicated, or group) that execute one or more software or firmware programs, a combinational logic circuit, and/or other suitable hardware components that provide the described functionality.

Figure 1:
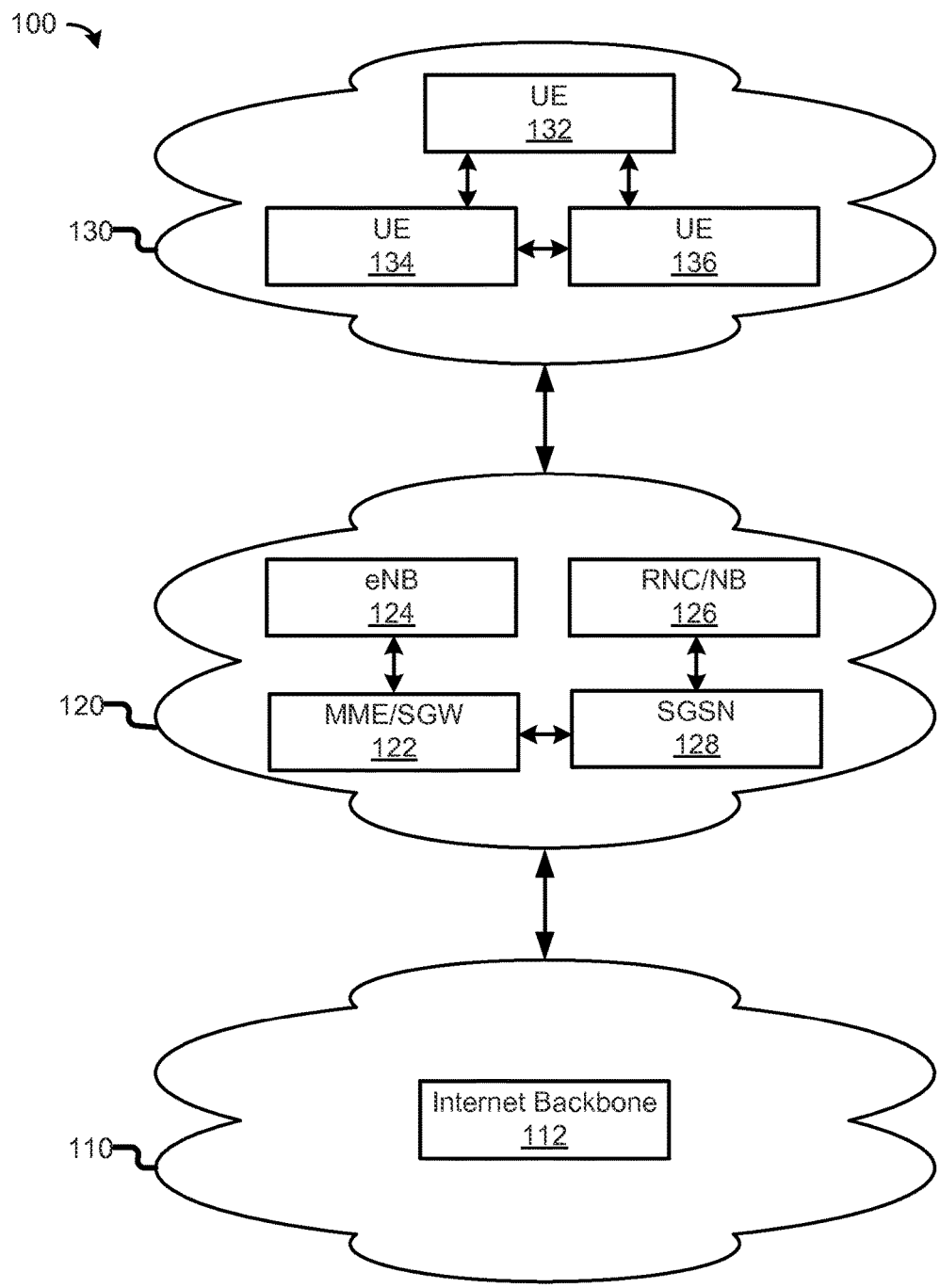
FIG. 1 schematically illustrates a wireless communication system in accordance with various embodiments.

FIG. 1 schematically illustrates a wireless communication system 100 that incorporates the D2D time resource pattern restriction and extension teaching of the present disclosure, in accordance with various embodiments. The wireless communication system 100 may include a backbone network 110, a cellular mobile network 120, and a D2D network 130. The D2D network 130 may include UEs 132, 134, and 136 that may also communicate using the cellular mobile network 120.

The backbone network 110 may be a part of computer network infrastructure that interconnects various sub-networks and provides a path for the exchange of information between these sub-networks. In various embodiments, the backbone network 110 may include Internet backbone 112, which may include the principal data routes between large, strategically interconnected computer networks and core routers on the Internet.

The cellular mobile network 120 may be in data communication with the backbone network 110. In various embodiments, the cellular mobile network 120 may include one or more radio access networks, such as a Global System for Mobile Communication (GSM), General Packet Radio Service (GPRS), Universal Mobile Telecommunications System (UMTS), High Speed Packet Access (HSPA), Evolved HSPA (E-HSPA), or Long-Term Evolution (LTE) network. In some embodiments, a radio access network may include GSM Enhanced Data rates for GSM Evolution (EDGE) Radio Access Network (GERAN), Universal Terrestrial Radio Access Network (UTRAN), or Evolved UTRAN (E-UTRAN). The cellular mobile network 120 may operate in accordance with other network technologies in other embodiments.

Mobile communication technology may rely on various standards and protocols to transmit data between a base station and a wireless communication device. Wireless communication system standards and protocols may include, for example, the 3GPP LTE; the Institute of Electrical and Electronics Engineers (IEEE) 802.16 standard, which is commonly known to industry groups as worldwide interoperability for microwave access (WiMAX); and the IEEE 802.11 standard, which is commonly known to industry groups as Wi-Fi. In a 3GPP radio access network (RAN), according to LTE, the base station may be referred to as an evolved Node B (also commonly denoted as eNodeB, or eNB). It may communicate with a wireless communication device, known as user equipment (UE). Although the present disclosure is presented with terminology and examples generally directed toward 3GPP systems and standards, the teaching disclosed herein may be applied to any type of wireless network or communication standard.

In various embodiments, the cellular mobile network 120 may include eNB 124, radio network controller (RNC) and legacy node B (NB) 126, mobility management entities (MME) and serving gateways (SGW) 122, and serving GPRS support nodes (SGSN) 128. eNB 124 may include more functionality than legacy NB 126, which may be used in a 3G network such as a UMTS network. For example, RNC functionality may be located in eNB 124 rather than being in a separate RNC entity. In LTE, eNB 124 may connect to another eNB by means of an X2 interface that allows the eNBs to forward or share information. In some embodiments, the cellular mobile network 120 may be an Internet Protocol (IP) based network, wherein interfaces between network entities (e.g., eNB 124 and MME/SGW 122) may be based on IP. In some embodiments, MME/SGW 122 may communicate with eNB 124 over an S1 interface. The S1 interface may be similar to the S1 interface as defined in 3GPP Technical Specification (TS) 36.410 V11.1.0 (2013-09) and may support a many-to-many relation between MME/SGW 122 and eNB 124. For example, different operators may simultaneously operate the same eNB in a network sharing setting. In some embodiments, communication between the eNB 124 and UEs may be facilitated via the MME/SGW 122. The MME/SGW 122 may be configured to manage signaling exchanges, e.g., authentication of a UE, such as the UE 132, or perform other actions associated with establishment of a communication link to establish a connected mode of the UE 132 with the cellular mobile network 120. In some embodiments, the MME/SGW 122 may be responsible for tracking and paging user equipment, e.g., when the UE 132 is in an idle mode.

For ease of illustration, various descriptions herein are provided to conform to 3GPP in the communication system 100; however, the subject matter of the present disclosure is not limited in this regard and the embodiments disclosed herein may be advantageously applied to other wired or wireless communication protocols or networks. For example, in an embodiment in which the cellular mobile network 120 includes a UTRAN, the eNB 124 may represent a radio network controller (RNC) configured to communicate with the UEs 132, 134, or 136 (discussed in additional detail below) via a NB. In an embodiment where the cellular mobile network 120 includes a GERAN, the eNB 124 may represent a base station controller (BSC) configured to communicate with the UEs 132, 134, or 136 via a base transmission station (BTS).

In various embodiments, the UE 132 may access the cellular mobile network 120 via a radio link with one of the base stations, e.g., eNB 124. A downlink (DL) transmission may be a communication from the eNB 124 to the UE 132. An uplink (UL) transmission may be a communication from the UE 132 to the eNB 124. Only limited numbers of UEs and eNBs are illustrated in FIG. 1 for ease of illustration. However, the communication system 100 may include any number of UEs, eNBs, or other servers while practicing suitable embodiments of the present disclosure. As an example, in some embodiments, the cellular mobile network 120 may also include other servers, such as a machine type communication (MTC) server (not shown) to facilitate MTC.

In some embodiments, the UE 134 may be configured to communicate with another machine. Data may be transmitted from the UE 134 to another machine or received by the UE 134 from another machine with the need for little or no human interaction. For example, the UE 134 may be a sensor that is electrically coupled to a wireless transceiver (e.g., the transceiver circuitry 224, discussed below with reference to FIG. 2), and may be configured to communicate, with little or no intervention, with another machine (e.g., another sensor). In some embodiments, the wireless transceiver of the UE 134 may also be configured to communicate with at least one of a wireless metropolitan area network (WMAN), a wireless local area network (WLAN), or a wireless personal area network (WPAN).

In some embodiments, the UE 136 may be a mobile communication device, a subscriber station, or another device that is configured to communicate with the cellular mobile network 120, e.g., via the eNB 124, in conformance with an appropriate protocol (e.g., a multiple-input/multiple-output (MIMO) communication scheme). As discussed in further detail below, the UEs, 132, 134, and/or 136 may be configured to enable D2D functionality. In embodiments, D2D functionality may also be referred to as sidelink direct communication (SL).

In various embodiments, UE 132, UE 134, and UE 136 may form a D2D network 130. In the D2D network 130, two UEs in proximity may directly communicate with each other without the assistance of eNB 124 or any other base stations and cellular mobile networks. Direct communication between devices is commonly known as device-to-device (D2D) direct communication or peer-to-peer (P2P) communication. In various embodiments, D2D communication may be established directly by UEs or may be at least partially facilitated by an eNB.

D2D operation in the D2D network 130 may be non-transparent to the cellular mobile network 120 and may occur on a cellular spectrum (for example, inband) or unlicensed spectrum (for example, outband). D2D operation in the D2D network 130 may be realized in different communication technologies. In some embodiments, short-range technologies, such as Bluetooth or Wi-Fi may be used. In some embodiments, D2D operation may reuse licensed LTE spectrum or unlicensed LTE spectrum.

In various embodiments, D2D operation in the D2D network 130 may include device discovery, whereby UEs are to determine whether they are within range and/or available for D2D operation before establishing a D2D session. Proximity detection may be assisted by the cellular mobile network 120, may be performed at least partially by UEs, or may be performed largely by UEs independently.

In various embodiments, D2D discovery may be closed D2D discovery or open D2D discovery. Closed D2D discovery may apply to use cases wherein a discoverable device may be discovered only by a select set of D2D-enabled discovering devices. For example, only pre-identified or selected devices may be allowed to connect, such as devices identified or selected by the cellular mobile network 120, a D2D server (not shown), an application (not shown), or a user (not shown). Thus, for this use case, a discovering device would be assumed to know, in advance, the D2D-enabled devices it wishes to discover in its proximity, including any corresponding identifiers.

On the other hand, open device discovery considers use cases wherein a discoverable device may want itself to be discovered by any or all D2D-enabled devices in its proximity. From the perspective of the discovering device, open device discovery implies that a discovering device may not be aware of the identity of other D2D enabled devices prior to discovery. Consequently, the device discovery mechanism for open discovery may aim toward discovering as many D2D-enabled devices in its proximity as possible.

In certain situations, such as for open D2D discovery using licensed resources, an eNB may have limited control of the discovery process among UEs. In particular, an eNB may periodically allocate certain discovery resources in the form of D2D discovery regions (e.g., time/frequency resources such as resource blocks or subframes) for UEs to transmit the discovery information. The discovery information may be in the form of a discovery sequence or discovery packet with payload information.

In various embodiments, D2D operation in the D2D network 130 may improve spectrum utilization, increase network throughput, reduce transmission delay, offload traffic for eNB 124, and alleviate congestion in the cellular mobile network 120. In this regard, D2D operation may have a wide variety of applications. For example, D2D network 130 may be used for local social networks, content sharing, location-based marketing, service advertisements, mobile-to-mobile applications, etc. In embodiments, the D2D network 130 may serve as a fallback public safety network that may function even when the cellular mobile network 120 becomes unavailable or fails.

Figure 2:
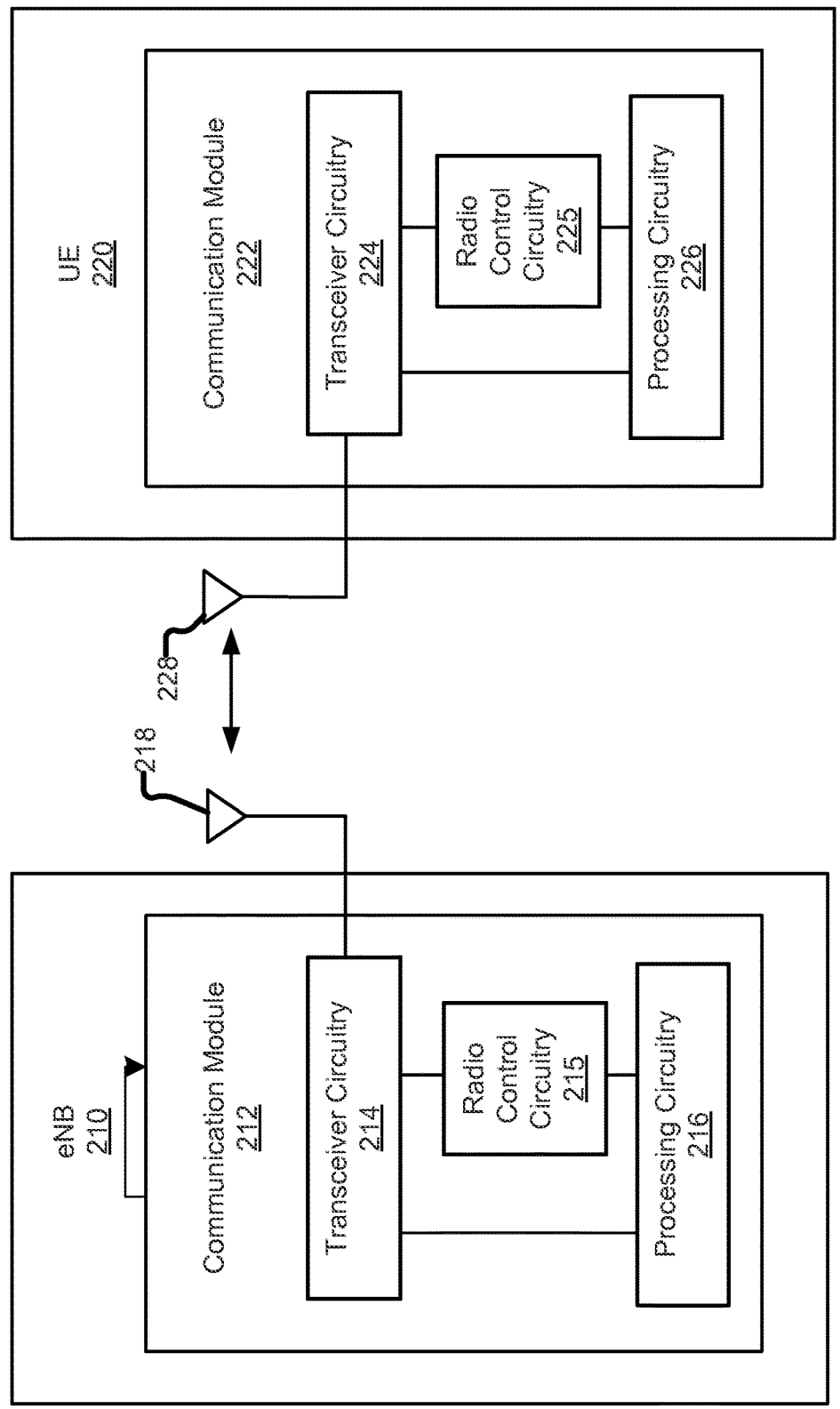
FIG. 2 is a schematic block diagram illustrating components of an evolved node B (eNB) and a UE in accordance with various embodiments.

FIG. 2 is a schematic block diagram illustrating components of an eNB 210 and a UE 220 in a wireless communication environment that incorporate the D2D time resource pattern restriction and extension teaching of the present disclosure in accordance with various embodiments. The eNB 210 may be similar to, and substantially interchangeable with eNB 124 of FIG. 1. In embodiments, the eNB 210 may include one or more antennas 218 and a communication module 212. In various embodiments, transceiver circuitry 214 and processing circuitry 216 within the communication module 212 may be coupled with each other as shown. Likewise, the UE 220 may be similar to, and substantially interchangeable with UE 132, 134, or 136 of FIG. 1. In embodiments, the UE 220 may include one or more antennas 228 and a communication module 222. In various embodiments, transceiver circuitry 224 and processing circuitry 226 within the communication module 222 may be coupled with each other as shown.

The transceiver circuitry 214 may be coupled with the antennas 218 to facilitate over-the-air communication of signals to and from the eNB 210. Operations of the transceiver circuitry 214 may include, but are not limited to, filtering, amplifying, storing, switching, etc. In various embodiments, the transceiver circuitry 214 may be configured to provide various signal processing operations on the signal to the antennas 218 with appropriate characteristics. In some embodiments, the transceiver circuitry 214 may be configured to communicate with UEs that have D2D operation capabilities. The transceiver circuitry 214 may be configured to receive signals from the antennas 218 for transmission to other components of the eNB 210 and/or for internal processing by the processing circuitry 216.

The processing circuitry 216 may generate configuration and control information to UEs of a serving cell, e.g., UE 220, and generate signals to transmit the configuration and control information to the UEs via the transceiver circuitry 214. The configuration and control information may include, for example, downlink channel information, downlink control information (DCI), radio resource control (RRC) configuration information, etc. In some embodiments, such configuration and control information may include a SIB message to activate at least one of D2D discovery, D2D communication, or D2D relay functionality of the UE 220. In various embodiments, the processing circuitry 216 may generate different types of SIB messages for UE 220. As an example, processing circuitry 216 may generate a first-type SIB message for primary notification, followed by a second-type SIB message for secondary notification with authorization or configuration information for D2D operation. In various embodiments, the secondary notification to UE 220 may include information for preferred frequency spectrum for D2D operation, information for D2D synchronization source set-up, a public safety alert, or a public safety release message.

In various embodiments, processing circuitry 216 may generate the aforementioned SIB messages for numerous selected UEs in an alert region, for example, to build the D2D network 130 of FIG. 1. In some embodiments, communication module 212 may send the first-type SIB message with primary notification via Paging. A paging message may be used to communicate with UEs in RRC_IDLE as well as in RRC_CONNECTED modes. In some embodiments, communication module 212 may send the second-type SIB message with secondary notification via Cell Broadcast Service (CBS).

Similar to the communication module 212, the communication module 222 may be coupled with the antennas 228 to facilitate over-the-air communication of signals between UE 220 and eNB 210 or between UE 220 and another UE. For example, the transceiver circuitry 224 may be configured to provide various signal processing operations on the signal to the antennas 228 with suitable characteristics. In various embodiments, operations of the transceiver circuitry 224 may include, but are not limited to, filtering, amplifying, storing, switching, etc. The transceiver circuitry 224 may be configured to receive signals from the antennas 218, and then transmit the signals to other components of the UE 220 and/or for internal processing by the processing circuitry 226.

In some embodiments, the communication module 222 may be configured to receive the primary notification in a Paging Type 1 message if the UE 220 is in an RRC_IDLE state. In some embodiments, the communication module 222 may be configured to receive the primary notification in a System Information Change Indication (SICI) message if the UE is in an RRC_CONNECTED state. In some embodiments, the processing circuitry 226 may activate, in response to the primary notification, a reception of one or more cell broadcast messages containing one or more secondary notifications with authorization or configuration information for D2D operation. Thus, with the information contained in the secondary notifications, UE 220 may be properly configured for D2D operation, such as with preferred spectrums for D2D operation or proper D2D synchronization sources.

In some embodiments, the UE 220 may include one or more antennas 228 to concurrently utilize radio resources of multiple respective component carriers. The UE 220 may be configured to communicate using Orthogonal Frequency Division Multiple Access (OFDMA) (in, e.g., downlink communications) and/or Single-Carrier Frequency Division Multiple Access (SC-FDMA) (in, e.g., uplink communications). In some embodiments, the UE 220 may use the transceiver circuitry 224 to communicate with another UE via LTE ProSe or LTE Direct.

In some embodiments, communication module 222 may be configured to provide communication services for one or more subscriber identity modules (SIMs) (not shown) with which it may be coupled. In some embodiments, the SIMs may be removably coupled with the communication module 222. In other embodiments, the SIMs may be hardware and/or firmware that are permanently coupled with the UE 220. In various embodiments, the SIMs may include full-size SIMs, mini-SIMs, micro-SIMs, nano-SIMs, embedded SIMs, and/or virtual SIMs.

The SIMs may be integrated circuits that securely store subscriber identity information such as international mobile subscriber identity (IMSI) and related keys used to identify and authenticate one or more subscribers using the UE 220. Each SIM may be associated with different subscriber identity information and may or may not be associated with different carriers. In various embodiments, IMSI and related information may be used to facilitate D2D discovery and D2D operation.

Figure 7:
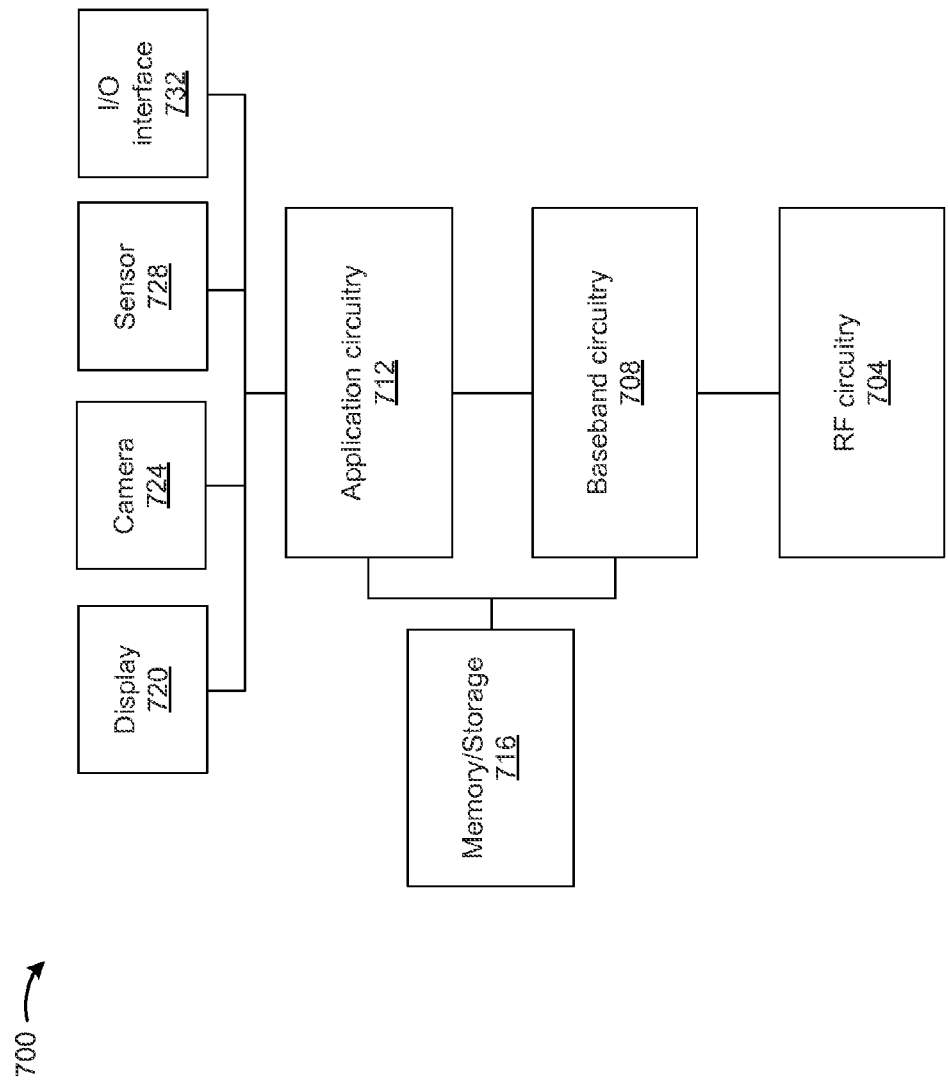
FIG. 7 is a block diagram of an example computing device that may be used to practice various embodiments described herein.

Some or all of the transceiver circuitry 224 and/or processing circuitry 226 may be included in, for example, radio frequency (RF) circuitry or baseband circuitry as described below with respect to FIG. 7. In various embodiments the UE 220 may be, may include, or may be included in a single sensor device, a cellular telephone, a personal computer (PC), a notebook, an ultrabook, a netbook, a smartphone, an ultra mobile PC (UMPC), a handheld mobile device, an universal integrated circuit card (UICC), a personal digital assistant (PDA), a Customer Premise Equipment (CPE), a tablet computing device, or other consumer electronics such as MP3 players, digital cameras, and the like. In some embodiments, the UE may include a mobile station, as defined by IEEE 802.16e (2005 or 802.16m (2009) or some other revision of the IEEE 802.16 standard, or user equipment, as defined by 3GPP LTE Release 8 (2008), Release 9 (2009), Release 10 (2011), Release 12 (under development), or some other revision or release of the 3GPP LTE standards.

In embodiments, a predefined set of bitmaps may be used to construct a time resource pattern for transmission (T-RPT) for D2D communication between UEs. In embodiments, the bitmaps may be defined to have a number of bits 'N', with a number of ones 'k'. In embodiments, N may be an integer from 6 to 8 inclusive, but may be a larger or smaller integer in various embodiments. The bitmaps may correspond to subframes used for transmission, with a one in the bitmap corresponding to a subframe allowed for transmission by a transmitting UE and a zero in the bitmap corresponding to a subframe that cannot be used for transmission by a transmitting UE. The set of bitmaps may differ depending on network configuration or mode of operation in various embodiments. For example, N may be 8 for frequency division duplex (FDD) and time division duplex (TDD) (UL-DL configurations 1, 2, 3, and 5); N may be 7 for TDD UL-DL configuration 0; and N may be 6 for UL-DL configurations 3 and 6 in various embodiments. UL-DL configurations 0-7 may be defined as described in relevant 3GPP technical specifications (TSs) such as, for example, 3GPP TS 36.211 version 11.5.0 (2013 Dec. 20).

In embodiments, T-RPTs may be established by an eNB, a UE, or a combination of an eNB and a UE. In embodiments, Mode-1 operation may occur when an eNB establishes the T-RPT for the transmitting UE. Mode-2 operation may occur in various embodiments when an eNB allocates a resource pool, and a UE selects a T-RPT from the resource pool. Additional ways of establishing a T-RPT may occur in other embodiments, such as by using solely a UE rather than an eNB or both an eNB and a UE, for example. In embodiments, the k values may be {1, 2, 4, N} for Mode-1 operation and {1, 2, 4} for Mode-2 operation. In embodiments, the k values may include values from 1 to N. In embodiments, the set of bitmaps may be an ordered set having an index 'I'. The bitmap of size N may be repeated over a data resource pool to construct an entire T-RPT, in various embodiments.

In embodiments, the predefined set of bitmaps may be as shown in Table 1, with the 'k', 'N', and 'I' parameters having subscripts of TRPT, indicating they are associated with a time resource pattern for transmission. In Table 1, the set of bitmaps includes 107 bitmaps having N=8 bits and k={1, 2, 4, 8}. The predefined set of bitmaps may have a different N value, different k values, or a different order in various embodiments.

TABLE 1

Bitmaps for T-RPT generation. N = 8, k = {1, 2, 4, 8}.

| $I_{TRPT}$ | Bitmap | RB |
|---|---|---|
| K = 1 | | |
| 0 | 10000000 | 0 |
| 1 | 01000000 | 0 |
| 2 | 00100000 | 0 |
| 3 | 00010000 | 0 |
| 4 | 00001000 | 0 |
| 5 | 00000100 | 0 |
| 6 | 00000010 | 0 |
| 7 | 00000001 | 0 |
| K = 2 | | |
| 8 | 11000000 | 1 |
| 9 | 10100000 | 1 |
| 10 | 10010000 | 1 |
| 11 | 10001000 | 1 |
| 12 | 10000100 | 1 |
| 13 | 10000010 | 1 |
| 14 | 10000001 | 1 |
| 15 | 01100000 | 1 |
| 16 | 01010000 | 1 |
| 17 | 01001000 | 1 |
| 18 | 01000100 | 1 |
| 19 | 01000010 | 1 |
| 20 | 01000001 | 1 |
| 21 | 00110000 | 1 |
| 22 | 00101000 | 1 |
| 23 | 00100100 | 1 |
| 24 | 00100010 | 1 |
| 25 | 00100001 | 1 |
| 26 | 00011000 | 1 |
| 27 | 00010100 | 1 |

TABLE 1-continued

Bitmaps for T-RPT generation. N = 8, k = {1, 2, 4, 8}.

| $I_{TRPT}$ | Bitmap | RB |
|---|---|---|
| 28 | 00010010 | 1 |
| 29 | 00010001 | 1 |
| 30 | 00001100 | 1 |
| 31 | 00001010 | 1 |
| 32 | 00001001 | 1 |
| 33 | 00000110 | 1 |
| 34 | 00000101 | 1 |
| 35 | 00000011 | 1 |
| K = 4 | | |
| 36 | 11110000 | 0 |
| 37 | 11101000 | 0 |
| 38 | 11100100 | 0 |
| 39 | 11100010 | 0 |
| 40 | 11100001 | 0 |
| 41 | 11011000 | 0 |
| 42 | 11010100 | 0 |
| 43 | 11010010 | 0 |
| 44 | 11010001 | 0 |
| 45 | 11001100 | 0 |
| 46 | 11001010 | 0 |
| 47 | 11001001 | 0 |
| 48 | 11000110 | 0 |
| 49 | 11000101 | 0 |
| 50 | 11000011 | 0 |
| 51 | 10111000 | 0 |
| 52 | 10110100 | 1 |
| 53 | 10110010 | 0 |
| 54 | 10110001 | 0 |
| 55 | 10101100 | 0 |
| 56 | 10101010 | 0 |
| 57 | 10101001 | 0 |
| 58 | 10100110 | 0 |
| 59 | 10100101 | 0 |
| 60 | 10100011 | 0 |
| 61 | 10011100 | 0 |
| 62 | 10011010 | 0 |
| 63 | 10011001 | 0 |
| 64 | 10010110 | 0 |
| 65 | 10010101 | 0 |
| 66 | 10010011 | 0 |
| 67 | 10001110 | 0 |
| 68 | 10001101 | 0 |
| 69 | 10001011 | 0 |
| 70 | 10000111 | 0 |
| 71 | 01111000 | 0 |
| 72 | 01110100 | 0 |
| 73 | 01110010 | 0 |
| 74 | 01110001 | 0 |
| 75 | 01101100 | 0 |
| 76 | 01101010 | 0 |
| 77 | 01101001 | 0 |
| 78 | 01100110 | 0 |
| 79 | 01100101 | 0 |
| 80 | 01100011 | 0 |
| 81 | 01011100 | 0 |
| 82 | 01011010 | 0 |
| 83 | 01011001 | 0 |
| 84 | 01010110 | 0 |
| 85 | 01010101 | 0 |
| 86 | 01010011 | 0 |
| 87 | 01001110 | 0 |
| 88 | 01001101 | 0 |
| 89 | 01001011 | 0 |
| 90 | 01000111 | 0 |
| 91 | 00111100 | 0 |
| 92 | 00111010 | 0 |
| 93 | 00111001 | 0 |
| 94 | 00110110 | 0 |
| 95 | 00110101 | 0 |
| 96 | 00110011 | 0 |
| 97 | 00101110 | 0 |
| 98 | 00101101 | 0 |
| 99 | 00101011 | 0 |
| 100 | 00100111 | 0 |
| 101 | 00011110 | 0 |
| 102 | 00011101 | 0 |
| 103 | 00011011 | 0 |
| 104 | 00010111 | 0 |
| 105 | 00001111 | 0 |
| K = 8 | | |
| 106 | 11111111 | 0 |

If the set is not restricted or modified in some manner, a time resource pattern for transmission may be constructed by randomly or pseudo-randomly choosing one of the bitmaps from the set shown in Table 1. In embodiments, a subset of the predefined set shown in Table 1 may be selected. The subset may be selected by constraining the allowable k values, in various embodiments. In embodiments, a restriction bitmap (RB) may be configured to select the subset. This is illustrated in Table 1 by an RB field that indicates whether each bitmap in the set of bitmaps has been selected. An RB value of 0 indicates the corresponding bitmap is not in the subset, and an RB value of 1 indicates the corresponding bitmap is in the subset. In embodiments, a time resource pattern bitmap may be randomly or pseudo-randomly selected from the subset by a wireless communications device and the wireless communications device may communicate with another wireless communications device using a time resource pattern corresponding to the selected bitmap, where bits of the selected bitmap indicate subframes of a communication frame that allow D2D communications.

In embodiments, an extension factor may be configured and applied to the bitmaps to increase an effective bitmap size. For example, an extension factor of 2 may provide 16-bit length patterns for N=8. The effective bitmap size may be increased in a variety of ways in various embodiments.

Figure 3:
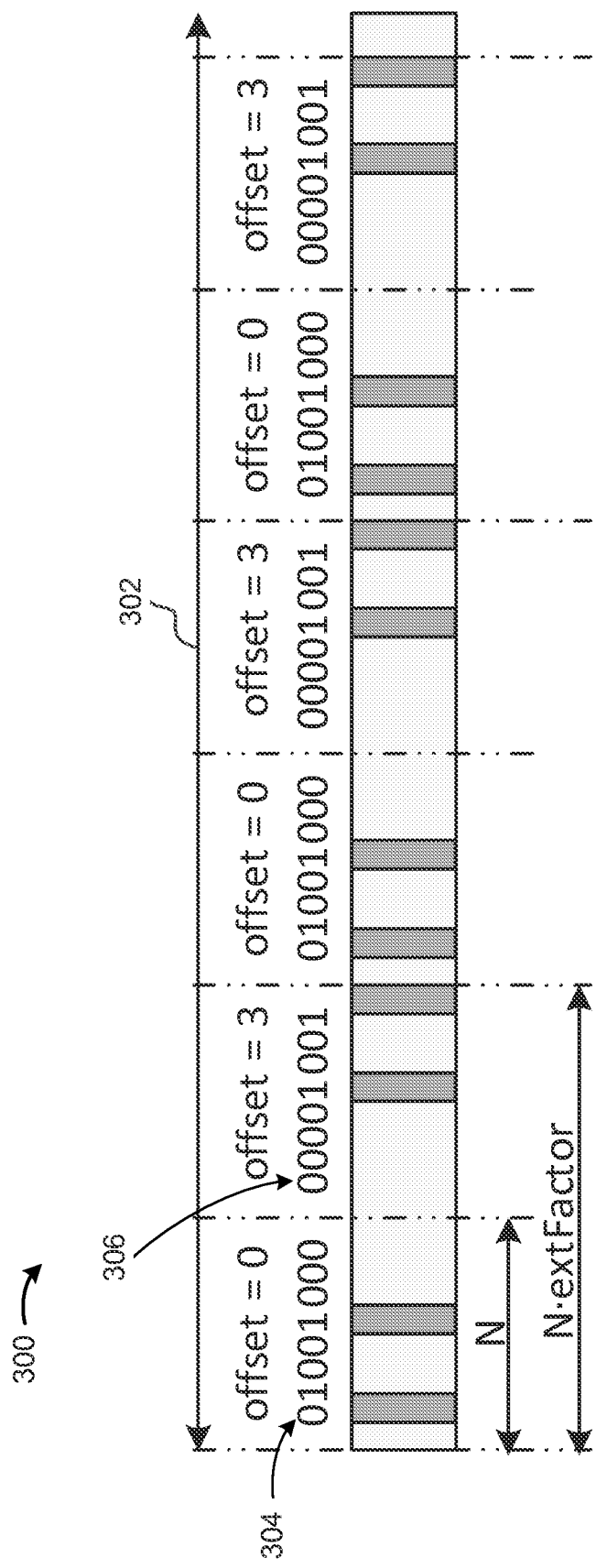
FIG. 3 illustrates an example of bitmap extension based at least in part on pseudo-random circular shift in accordance with various embodiments.

FIG. 3 illustrates a bitmap extension 300 using a bitmap shift. In embodiments, the bitmap shift may be a pseudo-random circular shift. As shown, the bitmap extension 300 extends a bitmap with N=8 bits by an extension factor, extFactor=2, to generate an extended bitmap of 16 bits. In embodiments, the bitmap may be extended across a scheduling assignment (SA) and data period, saPeriod 302. The data period may be a Mode-2 data period in various embodiments. In embodiments, a first bitmap 304 may correspond to the first N subframes of the saPeriod 302. In embodiments, the first bitmap 304 may be a bitmap selected from a subset of a predefined set of D2D time resource pattern bitmaps. In embodiments, the first bitmap 304 may be cyclically shifted to generate additional bitmaps. In the example shown, the first bitmap 304 is used with an offset of 0 for the first N subframes of the saPeriod 302 and is shifted 3 bits, as indicated by an offset=3, for the second N subframes of the saPeriod 302 to generate a second bitmap 306. The first bitmap 304 and the second bitmap 306 are then repeated across the remainder of the saPeriod 302.

Figure 4:
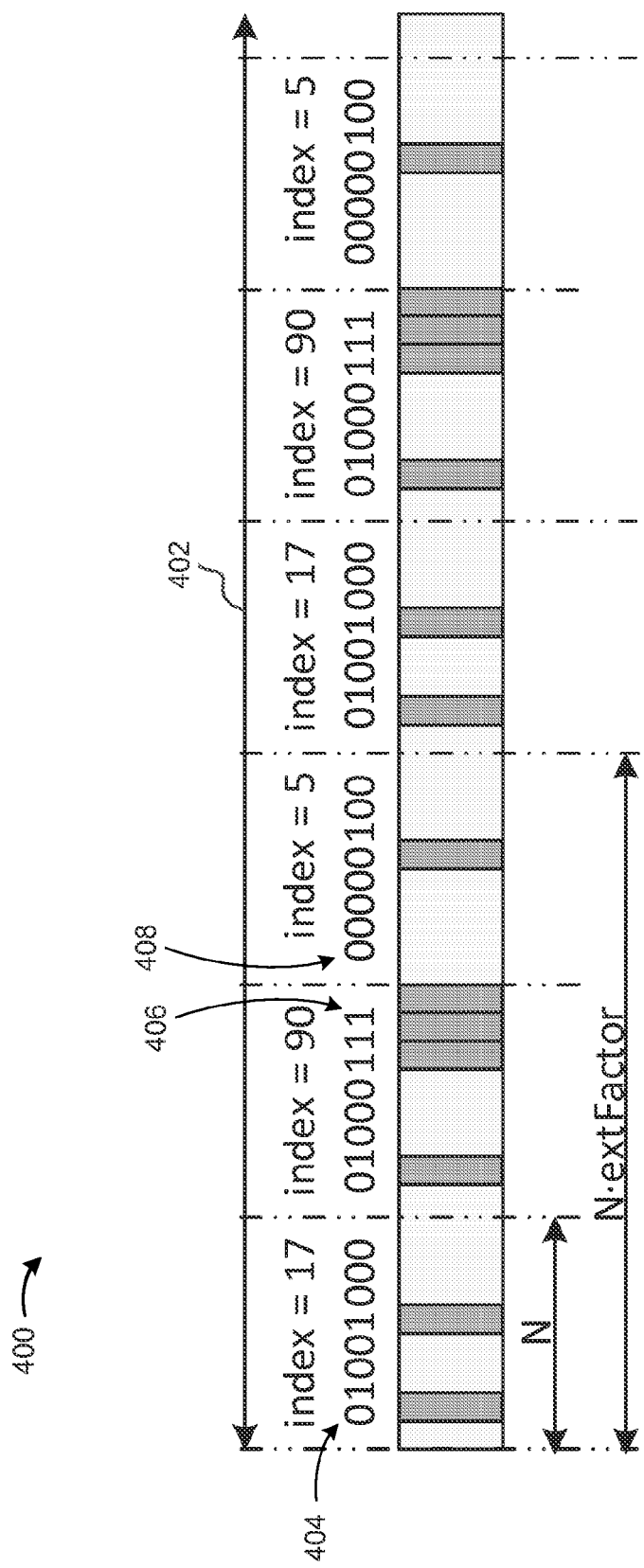
FIG. 4 illustrates an example of bitmap extension based at least in part on pseudo-random bitmap index change in accordance with various embodiments.

FIG. 4 illustrates a bitmap extension 400 using a bitmap index change. In embodiments, the bitmap index change may be a pseudo-random bitmap index change. As shown, the bitmap extension 400 extends a bitmap with N=8 bits by an extension factor, extFactor=3, to generate an extended bitmap of 24 bits. In embodiments, the bitmap may be extended across an SA and data period, saPeriod 402. The data period may be a Mode-2 data period in various embodiments. In embodiments, a first bitmap 404 may correspond to a first N subframes of the saPeriod 402. In embodiments, the first bitmap 404 may be a bitmap selected from a subset of a predefined set of D2D time resource pattern bitmaps. In the example shown, the first bitmap 404 corresponds with an index of 17 in the predefined set of D2D time resource pattern bitmaps, such as that shown with respect to Table 1. In embodiments, additional bitmaps may be determined according to a pseudo-random rule that selects the bitmaps from a subset of the predefined set of D2D time resource pattern bitmaps. In embodiments, an index value may be selected using a pseudo-random binary sequence initialized with a scheduling assignment identifier (SA-ID) and/or a selected T-RPT index. In the example shown, a second bitmap 406, with index=90, and a third bitmap 408, with index=5, follow the first bitmap 404. The first bitmap 404, the second bitmap 406, and the third bitmap 408 are then repeated across the remainder of the saPeriod 402.

Figure 5:
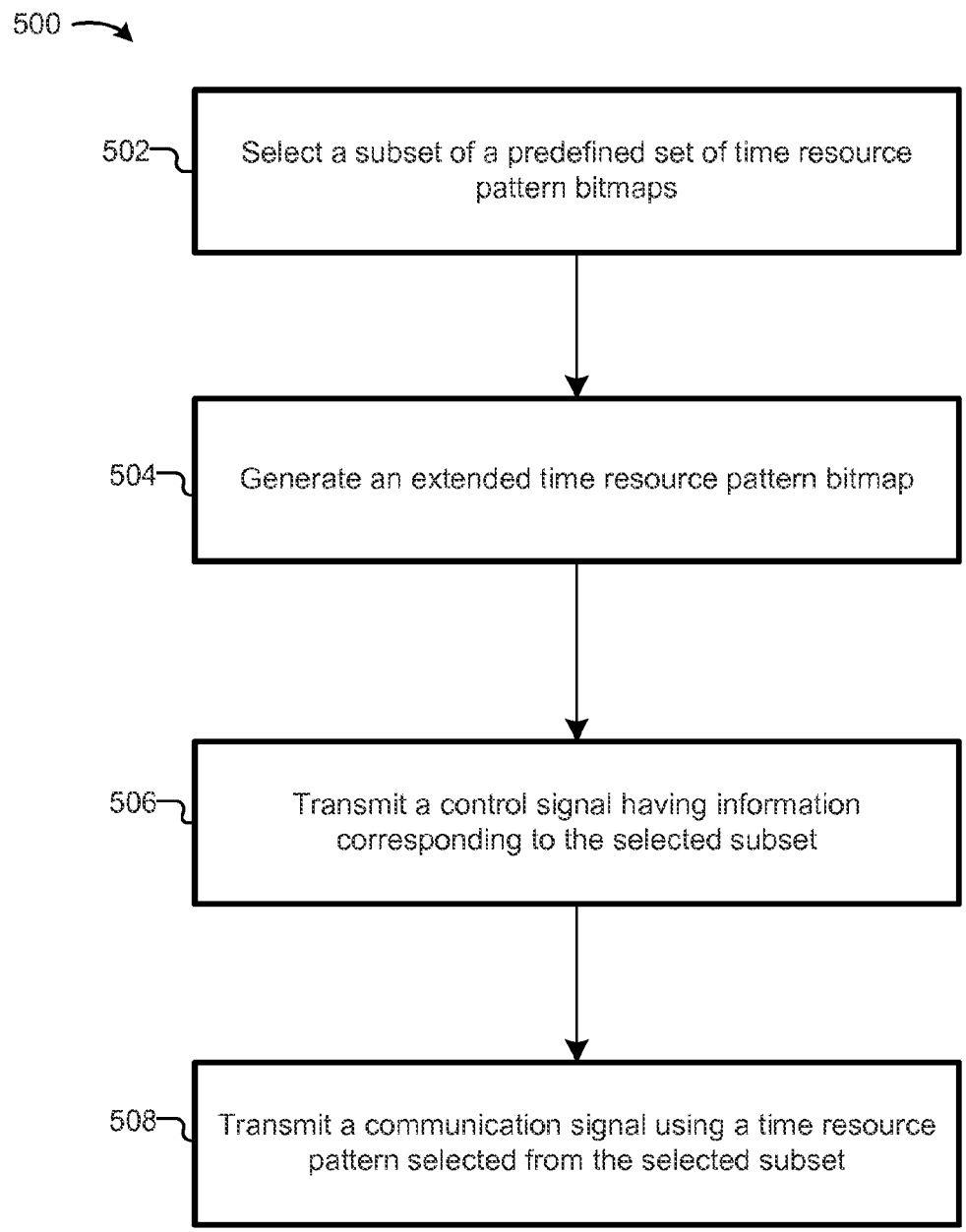
FIG. 5 is a flowchart illustrating a method for transmitting a D2D signal using a time resource pattern selected from a subset of time resource pattern bitmaps in accordance with various embodiments.

FIG. 5 is a flowchart illustrating a method 500 of transmitting a signal using a time resource pattern selected from a subset of time resource pattern bitmaps in accordance with various embodiments. In embodiments, rather than selecting a bitmap for T-RPT from all available combinations, a subset of the combinations may be selected, from which T-RPTs may be constructed. This may be beneficial in embodiments because different patterns may have different maximum data rates, and it may be beneficial from a system perspective to restrict the allowable combinations to control half-duplex problems, maximum data rate, reduce interference dynamics, and/or improve channel state information (CSI) measurement overhead and direct link adaptation. In embodiments, a higher layer of signaling, such as through RRC, may be used to indicate which T-RPT indexes can be used for D2D data transmission and/or D2D link adaptation (e.g., channel quality indicator (CQI), reference signal received power (RSRP), reference signal received quality (RSRQ) reporting over direct links).

At a block 502, a subset of a predefined set of D2D time resource pattern bitmaps may be selected from a predefined set of time resource pattern bitmaps. In embodiments, individual D2D time resource pattern bitmaps are to indicate subframes of a communication frame that allow D2D communications. The predefined set of time resource pattern bitmaps may correspond to the set of 107 bitmaps shown in Table 1, for example. In embodiments, the processing circuitry 216 of the eNB 210 or the processing circuitry 226 of the UE 220 may select the subset. In embodiments, the radio control circuitry 215 or 225 may generate a control signal having information corresponding to the selected subset of time resource pattern bitmaps. In embodiments, the processing circuitry 216 or 226 may generate the control signal. In embodiments, the subset may be selected by configuring the set of k which can be used for T-RPT bitmap selection and/or generation. For example, for a case where the full set of k may be {1, 2, 4}, with N=8, as may be the case in some embodiments for FDD Mode-2, the subset may be configured by using only k=1, reducing the possible number of different T-RPTs to 8. In embodiments, the subset may be chosen such that the bitmaps within the subset are orthogonal to each other.

Alternatively, in embodiments, the subset may be selected by using a restriction bitmap over a possible set of T-RPT indexes corresponding to bitmap combinations. The restriction bitmap size may be of a maximum number of different T-RPTs for a current network setting (e.g., duplexing mode, UL-DL configuration, etc.). For example, in FDD Mode-2 operation there may be 106 different patterns corresponding to k={1, 2, 4} in relation to the set of bitmaps shown in Table 1. Accordingly, a restriction bitmap with a 106 bit length may be used in this example, where bit values in the restriction bitmap of '1' enable the corresponding T-RPT index in a set and bit values of '0' disable the corresponding T-RPT index. For example, a 106 bit restriction bitmap configured according to Table 1, without using the k=8 bitmap with index of 106, enables only T-RPTs with k=2 and a single bitmap from the k=4 set (index $I_{TRPT}=52$).

In various embodiments, a combination of k value restriction and a restriction bitmap may be used to select the subset. In embodiments, k may be restricted to a single value or a subset of possible k values, with a restriction bitmap defined over the subset of restricted k values. For example, k may be restricted to k={1, 2}, with a corresponding restriction bitmap having a length of 36 bits.

At a block 504, an extended time resource pattern may be generated. Transmitting with a T-RPT based at least in part on the extended time resource pattern may increase interference randomization and result in decreased collisions in various embodiments. In embodiments, the extended time resource pattern may be generated by the processing circuitry 216 of the eNB 210 or the processing circuitry 226 of the UE 220. In embodiments, an extension factor may be configured or calculated based at least in part on a scheduling cycle. The extension factor may equal a number of repetitions of the selected T-RPT bitmap to span available D2D subframes within a data scheduling period, in various embodiments. In embodiments, the extended time resource pattern may be applied to all T-RPTs within a scheduling assignment (SA) and period, such as a Mode-2 period. A scheduling assignment may communicate control information at a D2D layer, in various embodiments.

The extended time resource pattern may be generated based at least in part on a bitmap shift in various embodiments. In embodiments, a randomly or pseudo-randomly selected bitmap pattern from the selected subset may be cyclically shifted across repetitions inside a scheduling cycle as shown with respect to FIG. 3, for example. In embodiments, to provide additional randomization, the shift value may be based at least in part on a pseudo-random binary sequence (PRBS) initialized with a scheduling assignment identifier (SA-ID). In embodiments using a bitmap shift to generate the extended time resource pattern, the number of ones, k, may remain the same across repetitions. The extension factor may be bounded by min {(N−1), X}, where X is the number of repetitions of the T-RPT bitmap to span the available D2D data subframes within a data scheduling period, in various embodiments.

In embodiments, the extended time resource pattern may be generated based at least in part on a T-RPT bitmap index shift. In embodiments, a randomly or pseudo-randomly selected index from the selected subset may be cyclically shifted inside the subset. An extension bitmap may be constructed from the first index and cyclic offsets of the index in various embodiments. In embodiments, the cyclic shift may be deterministic and dependent on a subframe or repetition counter. The cyclic shift may be pseudo-randomly calculated using PRBS, with the first index and SA-ID as initialization parameters in various embodiments. In embodiments, additional bitmaps may be generated by a pseudo-random rule.

In embodiments, the extended time resource pattern may be generated based at least in part on a pseudo-random bitmap index change as shown with respect to FIG. 4, for example. In embodiments, the bitmap pattern index may be changed from repetition to repetition based at least in part on a pseudo-random rule generated using PRBS initialized by SA-ID and/or a selected T-RPT index. In embodiments, bitmap restriction techniques used to select the subset at the block 502 and/or bitmap extension techniques used to generate an extended time resource pattern bitmap at the block 504 may be used for configuration of D2D resource pool bitmaps used for D2D discovery or data and control signaling transmission, including scheduling assignment.

At a block 506, a control signal having information corresponding to the selected subset may be transmitted. In embodiments, the control signal may include information corresponding to the extended time resource pattern. The control signal may be a radio resource control (RRC) signal transmitted by the transceiver circuitry 214 of the eNB 210 or the transceiver circuitry 224 of the UE 220 in various embodiments. The transmitted control signal may be based at least in part on a control signal generated by the radio control circuitry 215, the radio control circuitry 225, the processing circuitry 216 or the processing circuitry 226, in various embodiments. The control signal may include information corresponding to allowed k values and/or a restriction bitmap in various embodiments. In embodiments, the control signal may be a RRC signal for Mode-2 D2D operation or Mode-1 link adaptation, for example. In embodiments, the radio control circuitry 215 may control the transceiver circuitry 214 or the radio control circuitry 225 may control the transceiver circuitry 224 to send the control signal. In embodiments, the control signal may be sent from a first UE to a second UE.

At a block 508, a communication signal may be transmitted using a time resource pattern selected from the selected subset. In embodiments, a control signal may also be transmitted that may include a frequency resource indicator and a T-RPT index corresponding to a bitmap selected from the subset. In embodiments, the control signal may also include a SA-ID. In embodiments, the time resource pattern may be selected by randomly or pseudo-randomly choosing a bitmap from the subset of time resource pattern bitmaps. The selected bitmap of size N may be repeated over a data resource pool to construct an entire T-RPT, in various embodiments. In embodiments, the signal may be transmitted using an extended time resource pattern generated in a manner described with respect to the block 504, for example. In embodiments, the signal may be transmitted by the transceiver circuitry 224 of the UE 220. In embodiments, the radio control circuitry 225 may control the transceiver circuitry 224 to send a message to another UE using a time resource pattern selected from the selected subset of D2D time resource pattern bitmaps.

Figure 6:
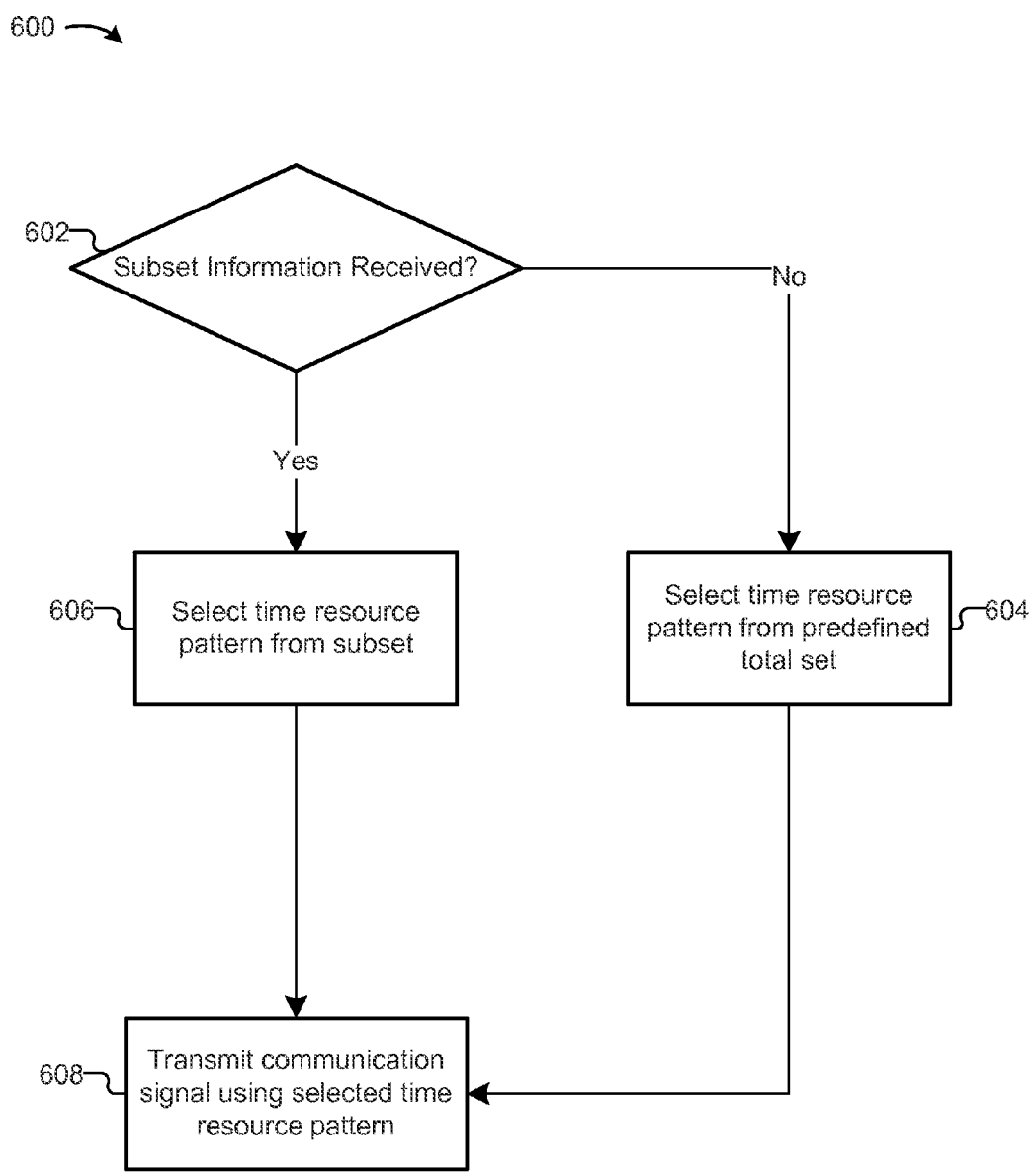
FIG. 6 is a flowchart illustrating a method of transmitting a D2D signal using a selected time resource pattern in accordance with various embodiments.

FIG. 6 is a flowchart of a method 600 of transmitting a D2D signal using a selected time resource pattern. At a decision block 602, it may be determined whether subset information has been received. In embodiments, the processing circuitry 226 of the UE 220 may determine whether the subset information has been received. In embodiments, the subset information may be received in a RRC signal from another UE or from an eNB such as the eNB 210, for example. If, at the decision block 602, it was determined the subset information has not been received, the method 600 may proceed to a block 604 where a time resource pattern may be selected from a predefined total set of time resource pattern bitmaps such as the set of bitmaps shown in Table 1, for example. In embodiments, the processing circuitry 226 of the UE 220 may select the time resource pattern. In embodiments, the time resource pattern may be selected by randomly or pseudo-randomly choosing a bitmap from the predefined total set of time resource pattern bitmaps.

If, at the decision block 602, it was determined that subset information has been received, the method 600 may proceed to a block 606 where a time resource pattern may be selected from the subset. In embodiments, the processing circuitry 226 of the UE 220 may select the time resource pattern. In embodiments, the time resource pattern may be selected by randomly or pseudo-randomly choosing a bitmap from the subset of time resource pattern bitmaps. The selected bitmap of size N may be repeated over a data resource pool to construct an entire T-RPT, in various embodiments. After the time resource pattern is selected at the block 604 or the block 606, a communication signal may be transmitted using the selected time resource pattern at a block 608. The signal may be transmitted by the transceiver circuitry 224 of the UE 220, for example. In embodiments, the radio control circuitry 225 may control the transceiver circuitry 224 to send a message to another UE using the selected time resource pattern.

In embodiments, a control signal may also be transmitted that may indicate an index of the selected time resource pattern and may indicate an SA-ID. In embodiments, another UE, such as the UE 136, which may be configured in a similar manner to the UE 220, may receive the control signal and the communication signal from the UE 220. The receiving UE may include processing circuitry corresponding to the processing circuitry 226 that includes extension pattern reconstruction logic. The receiving UE may also include radio control circuitry corresponding to the radio control circuitry 225 and a transceiver corresponding to the transceiver 224. In embodiments, the radio control circuitry of the receiving UE may control the transceiver circuitry of the receiving UE to receive the control signal and the processing circuitry of the receiving UE may determine an extended D2D time resource pattern bitmap based at least in part on the control signal and the predefined set of D2D time resource pattern bitmaps. In embodiments, the receiving UE may determine an extended time resource pattern based at least in part on the predefined set of D2D time resource pattern bitmaps, the SA-ID and/or the T-RPT index received in the control signal using the extension pattern reconstruction logic. In embodiments, the extension pattern reconstruction logic may determine the extended time resource pattern based at least in part on a pseudo-random algorithm that is the same algorithm used by the transmitting UE to determine an extended time resource pattern. Aspects of the methods 500 or 600 described with respect to FIGS. 5 and 6 may be performed by a wireless communications device that may be a base station such as an eNB or a UE in various embodiments.

The UE 220 or the eNB 210, as described in connection with FIG. 2, may be implemented into a system using any suitable hardware, firmware, and/or software configured as desired. FIG. 7 illustrates, for one embodiment, an example system 700 including radio frequency (RF) circuitry 704, baseband circuitry 708, application circuitry 712, memory/storage 716, display 720, camera 724, sensor 728, and input/output (I/O) interface 732, coupled with each other at least as shown.

The application circuitry 712 may include circuitry such as, but not limited to, one or more single-core or multi-core processors. The processor(s) may include any combination of general-purpose processors and dedicated processors (e.g., graphics processors, application processors, etc.). The processors may be coupled with memory/storage 716 and configured to execute instructions stored in the memory/storage 716 to enable various applications and/or operating systems running on the system 700.

The baseband circuitry 708 may include circuitry such as, but not limited to, one or more single-core or multi-core processors. The processor(s) may include a baseband processor. The baseband circuitry 708 may handle various radio control functions that enable communication with one or more radio networks via the RF circuitry 704. The radio control functions may include, but are not limited to, signal modulation, encoding, decoding, radio frequency shifting, etc. In some embodiments, the baseband circuitry 708 may provide for communication compatible with one or more radio technologies. For example, in some embodiments, the baseband circuitry 708 may support communication with an E-UTRAN and/or other WMAN, a WLAN, or a WPAN. Embodiments in which the baseband circuitry 708 is configured to support radio communications of more than one wireless protocol may be referred to as multi-mode baseband circuitry.

In various embodiments, baseband circuitry 708 may include circuitry to operate with signals that are not strictly considered as being in a baseband frequency. For example, in some embodiments, baseband circuitry 708 may include circuitry to operate with signals having an intermediate frequency, which is between a baseband frequency and a radio frequency.

In some embodiments, the processing circuitry 216 or 226 of FIG. 2 may be embodied in the application circuitry 712 and/or the baseband circuitry 708. In embodiments, the radio control circuitry 215 or 225 of FIG. 2 may be embodied in the baseband circuitry 708.

RF circuitry 704 may enable communication with wireless networks using modulated electromagnetic radiation through a non-solid medium. In various embodiments, the RF circuitry 704 may include switches, filters, amplifiers, etc., to facilitate the communication with the wireless network.

In various embodiments, RF circuitry 704 may include circuitry to operate with signals that are not strictly considered as being in a radio frequency. For example, in some embodiments, RF circuitry 704 may include circuitry to operate with signals having an intermediate frequency, which is between a baseband frequency and a radio frequency.

In some embodiments, the transceiver circuitry 214 or 224 of FIG. 2 may be embodied in the RF circuitry 704. In embodiments, the radio control circuitry 215 or 225 of FIG. 2 may be embodied in the RF circuitry 704.

In some embodiments, some or all of the constituent components of the baseband circuitry 708, the application circuitry 712, and/or the memory/storage 716 may be implemented together on a system on a chip (SOC).

Memory/storage 716 may be used to load and store data and/or instructions, for example, for system 700. Memory/storage 716 for one embodiment may include any combination of suitable volatile memory (e.g., dynamic random access memory (DRAM)) and/or non-volatile memory (e.g., Flash memory).

In various embodiments, the I/O interface 732 may include one or more user interfaces to enable user interaction with the system 700 and/or peripheral component interfaces to enable peripheral component interaction with the system 700. User interfaces may include, but are not limited to, a physical keyboard or keypad, a touchpad, a speaker, a microphone, etc. Peripheral component interfaces may include, but are not limited to, a non-volatile memory port, a universal serial bus (USB) port, an audio jack, and a power supply interface.

In various embodiments, sensor 728 may include one or more sensing devices to determine environmental conditions and/or location information related to the system 700. In some embodiments, the sensors may include, but are not limited to, a gyro sensor, an accelerometer, a proximity sensor, an ambient light sensor, and a positioning unit. The positioning unit may also be part of, or interact with, the baseband circuitry 708 and/or RF circuitry 704 to communicate with components of a positioning network, e.g., a global positioning system (GPS) satellite.

In various embodiments, the display 720 may include a display, e.g., a liquid crystal display, a touch screen display, etc. In some embodiments, the camera 724 may include many molded plastic aspheric lens elements made with varying dispersion and refractive indexes. In some embodiments, the camera 724 may include two or more lenses to capture three-dimensional images for stereo photography.

In various embodiments, the system 700 may be a mobile computing device such as, but not limited to, a laptop computing device, a tablet computing device, a netbook, an ultrabook, a smartphone, etc. In various embodiments, system 700 may have more or fewer components, and/or different architectures.

FIG. 8 illustrates an article of manufacture 810 having programming instructions, incorporating aspects of the present disclosure, in accordance with various embodiments. In various embodiments, an article of manufacture may be employed to implement various embodiments of the present disclosure. As shown, the article of manufacture 810 may include a computer-readable non-transitory storage medium 820 where instructions 830 may be configured to practice embodiments of or aspects of embodiments of any one of the processes described herein. The storage medium 820 may represent a broad range of persistent storage media known in the art, including but not limited to flash memory, dynamic random access memory, static random access memory, an optical disk, a magnetic disk, etc. In embodiments, computer-readable storage medium 820 may include one or more computer-readable non-transitory storage media. In other embodiments, computer-readable storage medium 820 may be transitory, such as signals, encoded with instructions 830.

In various embodiments, instructions 830 may enable an apparatus, in response to its execution by the apparatus, to perform various operations described herein. As an example, storage medium 820 may include instructions 830 configured to cause an apparatus, e.g., eNB 210 in connection with FIG. 2, to practice some aspects of enabling D2D functionality by selecting a subset of time resource pattern bitmaps and/or extending a time resource pattern bitmap, e.g., as illustrated in method 500 of FIG. 5, in accordance with embodiments of the present disclosure. As another example, storage medium 820 may include instructions 830 configured to cause an apparatus, e.g., UE 220 in connection with FIG. 2, to practice some aspects of enabling D2D functionality by selecting a subset of time resource pattern bitmaps and/or extending a time resource pattern bitmap, e.g., as illustrated in method 500 of FIG. 5 or method 600 of FIG. 6, in accordance with embodiments of the present disclosure.

The following paragraphs describe examples of various embodiments.

Example 1 may include an apparatus comprising: processing circuitry to select a subset of a predefined set of device-to-device (D2D) time resource pattern bitmaps, wherein individual D2D time resource pattern bitmaps are to indicate subframes of a communication frame that allow D2D communications; and radio control circuitry, coupled with the processing circuitry, the radio control circuitry to generate a signal having information corresponding to the selected subset of D2D time resource pattern bitmaps and to control transceiver circuitry to send the signal from a first user equipment (UE) to a second UE.

Example 2 may include the subject matter of Example 1, wherein the signal includes information corresponding to a subset bitmap that represents a set of permissible ones values, wherein each permissible ones value represents a number of ones that may be present in a time resource bitmap selected from the predefined set of D2D time resource pattern bitmaps.

Example 3 may include the subject matter of Example 1, wherein the signal includes information corresponding to a restriction bitmap, wherein each bit in the restriction bitmap corresponds to an index of the predefined set of D2D time resource pattern bitmaps, wherein a bit value of zero in the restriction bitmap represents that a D2D time resource pattern associated with the corresponding index is disabled, and wherein a bit value of one in the restriction bitmap represents that a D2D time resource pattern associated with the corresponding index is enabled.

Example 4 may include the subject matter of Example 1, wherein the signal includes information corresponding to a subset restriction bitmap, wherein each bit in the subset restriction bitmap corresponds to a subset index of a subset of the predefined set of D2D time resource pattern bitmaps, wherein a bit value of zero in the subset restriction bitmap represents that a D2D time resource pattern associated with the corresponding subset index is disabled, and wherein a bit value of one in the subset restriction bitmap represents that a D2D time resource pattern associated with the corresponding subset index is enabled.

Example 5 may include the subject matter of any one of Examples 1-4, wherein the radio control circuitry is to control transceiver circuitry to receive a control signal from the second UE, and wherein the processing circuitry is to determine an extended D2D time resource pattern bitmap based at least in part on the control signal and the predefined set of D2D time resource pattern bitmaps.

Example 6 may include the subject matter of any one of Examples 1-5, wherein the processing circuitry is also to generate an extended D2D time resource pattern bitmap based at least in part on a selected bitmap in the predefined set of D2D time resource pattern bitmaps, wherein the signal includes information corresponding to the extended D2D time resource pattern bitmap.

Example 7 may include the subject matter of any one of Examples 1-6, wherein the radio control circuitry is to control transceiver circuitry to send a message to the second UE using a time resource pattern selected from the subset of D2D time resource pattern bitmaps.

Example 8 may include an evolved node B (eNB) comprising: processing circuitry to: select a subset of a predefined set of device-to-device (D2D) time resource pattern bitmaps; and generate a signal having information corresponding to the selected subset of D2D time resource pattern bitmaps; and transceiver circuitry, coupled with the processing circuitry, to send the signal to a User Equipment (UE).

Example 9 may include the subject matter of Example 8, wherein the signal includes information corresponding to a subset bitmap that represents a set of permissible ones values, wherein each permissible ones value represents a number of ones that may be present in a time resource bitmap selected from the predefined set of D2D time resource pattern bitmaps.

Example 10 may include the subject matter of Example 8, wherein the signal includes information corresponding to a restriction bitmap, wherein each bit in the restriction bitmap corresponds to an index of the predefined set of D2D time resource pattern bitmaps, wherein a bit value of zero in the restriction bitmap represents that a D2D time resource pattern associated with the corresponding index is disabled, and wherein a bit value of one in the restriction bitmap represents that a D2D time resource pattern associated with the corresponding index is enabled.

Example 11 may include the subject matter of any one of Examples 8-10, wherein the signal is a radio resource control (RRC) signal.

Example 12 may include the subject matter of Example 8, wherein the signal includes information corresponding to a subset restriction bitmap, wherein each bit in the subset restriction bitmap corresponds to a subset index of a subset of the predefined set of D2D time resource pattern bitmaps, wherein a bit value of zero in the subset restriction bitmap represents that a D2D time resource pattern associated with the corresponding subset index is disabled, and wherein a bit value of one in the subset restriction bitmap represents that a D2D time resource pattern associated with the corresponding subset index is enabled.

Example 13 may include the subject matter of any one of Examples 8-12, wherein the processing circuitry is also to generate an extended D2D time resource pattern bitmap based at least in part on circularly shifting the selected bitmap.

Example 14 may include the subject matter of any one of Examples 8-12, wherein the processing circuitry is also to generate an extended D2D time resource pattern bitmap based at least in part on selecting bitmaps from the subset of the predefined set of bitmaps by selecting the bitmaps with a shifting index value.

Example 15 may include at least one non-transitory computer-readable medium comprising instructions stored thereon that, in response to execution of the instructions by one or more processors of a wireless communications device cause the wireless communications device to: select a subset of a predefined set of N bit sidelink direct communication (SL) time resource pattern bitmaps; and transmit a signal having information corresponding to the selected subset of SL time resource pattern bitmaps, wherein N is an integer between 6 and 8, inclusive, and wherein each bitmap in the predefined set of N bit SL time resource pattern bitmaps includes a number of ones selected from a set of permissible ones values that includes values from 1 to N.

Example 16 may include the subject matter of Example 15, wherein the wireless communications device is to select the subset based at least in part on whether bitmaps within the subset include a number of ones specified in a predetermined set of allowable values.

Example 17 may include the subject matter of Example 15, wherein the signal includes information corresponding to a restriction bitmap, wherein each bit in the restriction bitmap corresponds to an index of the predefined set of N bit SL time resource pattern bitmaps, wherein a bit value of zero in the restriction bitmap represents that an N bit SL time resource pattern associated with the corresponding index is disabled, and wherein a bit value of one in the restriction bitmap represents that an N bit SL time resource pattern associated with the corresponding index is enabled.

Example 18 may include the subject matter of any one of Examples 15-17, wherein the wireless communications device is further caused to transmit a signal to another wireless communications device using a time resource pattern selected from the selected subset of SL time resource pattern bitmaps.

Example 19 may include the subject matter of any one of Examples 15-18, wherein the wireless communications device is further caused to generate an extended SL time resource pattern bitmap based at least in part on a selected bitmap in the predefined set of SL time resource pattern bitmaps, wherein the signal includes information corresponding to the extended SL time resource pattern bitmap.

Example 20 may include the subject matter of Example 19, wherein the wireless communications device is caused to generate the extended SL time resource pattern bitmap based at least in part on circularly shifting the selected bitmap.

Example 21 may include a method, comprising: selecting, by a wireless communications device, a subset of a predefined ordered set of N bit device-to-device (D2D) time resource pattern bitmaps; selecting, by the wireless communications device, a time resource pattern bitmap from the subset; and transmitting, by the wireless communications device, a signal to another wireless communications device using a time resource pattern corresponding to the selected bitmap, wherein individual D2D time resource pattern bitmaps indicate subframes of a communication frame that allow D2D communications.

Example 22 may include the subject matter of Example 21, wherein the wireless communications device selects the subset based at least in part on whether bitmaps within the subset include a number of ones specified in a predetermined set of allowable values.

Example 23 may include the subject matter of Example 21, wherein the wireless communications device selects the subset based at least in part on a restriction bitmap, wherein each bit in the restriction bitmap corresponds to an index of the predefined ordered set of N bit D2D time resource pattern bitmaps, wherein a bit value of zero in the restriction bitmap represents that an N bit D2D time resource pattern associated with the corresponding index is disabled, and wherein a bit value of one in the restriction bitmap represents that an N bit D2D time resource pattern associated with the corresponding index is enabled.

Example 24 may include the subject matter of any one of Examples 21-23, further comprising generating, by the wireless communications device, an extended D2D time resource pattern bitmap based at least in part on a pseudo-random selection of an index value corresponding to a bitmap in the selected subset of D2D time resource pattern bitmaps, wherein the extended D2D time resource pattern bitmap includes more than N bits, and wherein transmitting includes transmitting the signal using an extended D2D time resource pattern corresponding to the generated extended D2D time resource pattern bitmap.

Example 25 may include the subject matter of any one of Examples 21-24, wherein selecting the time resource pattern bitmap from the subset is based at least in part on a pseudo-random selection process.

Example 26 may include a wireless communications device, comprising: means for selecting a subset of a predefined ordered set of N bit device-to-device (D2D) time resource pattern bitmaps; means for selecting a time resource pattern bitmap from the subset; and means for transmitting a signal to another wireless communications device using a time resource pattern corresponding to the selected bitmap, wherein individual D2D time resource pattern bitmaps indicate subframes of a communication frame that allow D2D communications.

Example 27 may include the subject matter of Example 26, wherein the means for selecting the subset is to select the subset based at least in part on whether bitmaps within the subset include a number of ones specified in a predetermined set of allowable values.

Example 28 may include the subject matter of Example 26, wherein the means for selecting the subset is to select the subset based at least in part on a restriction bitmap, wherein each bit in the restriction bitmap corresponds to an index of the predefined ordered set of N bit D2D time resource pattern bitmaps, wherein a bit value of zero in the restriction bitmap represents that an N bit D2D time resource pattern associated with the corresponding index is disabled, and wherein a bit value of one in the restriction bitmap represents that an N bit D2D time resource pattern associated with the corresponding index is enabled.

Example 29 may include the subject matter of any one of Examples 26-28, further comprising means for generating an extended D2D time resource pattern bitmap based at least in part on a pseudo-random selection of an index value corresponding to a bitmap in the selected subset of D2D time resource pattern bitmaps, wherein the extended D2D time resource pattern bitmap includes more than N bits, and wherein the means for transmitting is to transmit the signal using an extended D2D time resource pattern corresponding to the generated extended D2D time resource pattern bitmap.

Example 30 may include the subject matter of any one of Examples 26-29, wherein the means for selecting the time resource pattern bitmap from the subset is to select the time resource pattern bitmap based at least in part on a pseudo-random selection process.

The description herein of illustrated implementations, including what is described in the Abstract, is not intended to be exhaustive or to limit the present disclosure to the precise forms disclosed. While specific implementations and examples are described herein for illustrative purposes, a variety of alternate and/or equivalent embodiments or implementations calculated to achieve the same purposes may be made in light of the above detailed description, without departing from the scope of the present disclosure, as those skilled in the relevant art will recognize.

What is claimed is:

1. At least one non-transitory computer-readable medium comprising instructions stored thereon that, in response to execution of the instructions by one or more processors, cause a wireless communications device to:
   select a subset of a predefined set of device-to-device (D2D) time resource pattern bitmaps, wherein individual D2D time resource pattern bitmaps are to indicate subframes of a communication frame that allow D2D communications, wherein a one in the bitmap corresponds to a subframe allowed for transmission by a transmitting user equipment (UE) and a zero in the bitmap corresponds to a subframe that cannot be used for transmission by the transmitting UE;
   generate a parameter having information corresponding to the selected subset of D2D time resource pattern bitmaps to be signaled using radio resource control (RRC); and
   cause an RRC signal based at least in part on the parameter to be transmitted to a UE.

2. The at least one non-transitory computer-readable medium of claim 1, wherein the RRC signal includes a parameter that represents a set of permissible ones values, wherein each permissible ones value represents a count of one bits that may be present in a D2D time resource pattern bitmap selected from the predefined set of D2D time resource pattern bitmaps.

3. The at least one non-transitory computer-readable medium of claim 1, wherein the selected subset of D2D time resource pattern bitmaps is for mode-2 operation.

4. The at least one non-transitory computer-readable medium of claim 1, wherein the predefined set of D2D time resource pattern bitmaps have a number of bits N, wherein N is an integer between 6 and 8, inclusive.

5. The at least one non-transitory computer-readable medium of claim 1, wherein the predefined set of D2D time resource pattern bitmaps have a number of ones k, wherein k includes k values in a set {1, 2, 4}.

6. An evolved node B (eNB) comprising:
processing circuitry to:
select a subset of a predefined set of device-to-device (D2D) time resource pattern bitmaps, wherein individual D2D time resource pattern bitmaps are to indicate subframes of a communication frame that allow D2D communications, wherein a one in the bitmap corresponds to a subframe allowed for transmission by a transmitting user equipment (UE) and a zero in the bitmap corresponds to a subframe that cannot be used for transmission by the transmitting UE; and
generate a parameter having information corresponding to the selected subset of D2D time resource pattern bitmaps to be signaled using radio resource control (RRC); and
transceiver circuitry, coupled with the processing circuitry, to send an RRC signal based at least in part on the parameter to a UE.

7. The eNB of claim 6, wherein the RRC signal includes a parameter that represents a set of permissible ones values, wherein each permissible ones value represents a count of one bits that may be present in a D2D time resource bitmap selected from the predefined set of D2D time resource pattern bitmaps.

8. The eNB of claim 6, wherein the selected subset of D2D time resource pattern bitmaps is for mode-2 operation.

9. The eNB of claim 6, wherein the predefined set of D2D time resource pattern bitmaps have a number of bits N, wherein N is an integer between 6 and 8, inclusive.

10. The eNB of claim 6, wherein the predefined set of D2D time resource pattern bitmaps have a number of ones k, wherein k includes k values in a set {1, 2, 4}.

11. A user equipment (UE) comprising:
transceiver circuitry to receive a radio resource control (RRC) signal having information corresponding to a selected subset of a predefined set of device-to-device (D2D) time resource pattern bitmaps, wherein individual D2D time resource pattern bitmaps are to indicate subframes of a communication frame that allow D2D communications, wherein a one in the bitmap corresponds to a subframe allowed for transmission by a transmitting UE and a zero in the bitmap corresponds to a subframe that cannot be used for transmission by the transmitting UE; and
processing circuitry, coupled with the transceiver circuitry, to:
select a D2D time resource pattern bitmap from the selected subset based at least in part on the received RRC signal; and
direct the transceiver circuitry to communicate with another UE using the selected D2D time resource pattern bitmap.

12. The UE of claim 11, wherein the RRC signal includes a parameter that represents a set of permissible ones values, wherein each permissible ones value represents a count of one bits that may be present in a D2D time resource bitmap selected from the predefined set of D2D time resource pattern bitmaps.

13. The UE of claim 11, wherein the selected subset of D2D time resource pattern bitmaps is for mode-2 operation.

14. The UE of claim 11, wherein the predefined set of D2D time resource pattern bitmaps have a number of bits N, wherein N is an integer between 6 and 8, inclusive.

15. The UE of claim 11, wherein the predefined set of D2D time resource pattern bitmaps have a number of ones k, wherein k includes k values in a set {1, 2, 4}.

16. The UE of claim 11, wherein the transceiver circuitry is to use unlicensed long term evolution (LTE) spectrum when engaging in D2D communication with the other UE.

17. The UE of claim 11, wherein the transceiver circuitry is to use Bluetooth or Wi-Fi when engaging in D2D communication with the other UE.

18. The UE of claim 11, wherein the transceiver circuitry is to receive the RRC signal from an evolved Node B (eNB).

19. The UE of claim 11, wherein the processing circuitry is to select the D2D time resource pattern bitmap from the selected subset using random or pseudo-random selection.

20. An apparatus comprising:
means for selecting a subset of a predefined set of device-to-device (D2D) time resource pattern bitmaps, wherein individual D2D time resource pattern bitmaps are to indicate subframes of a communication frame that allow D2D communications, wherein a one in the bitmap corresponds to a subframe allowed for transmission by a transmitting user equipment (UE) and a zero in the bitmap corresponds to a subframe that cannot be used for transmission by the transmitting UE;
means for generating a radio resource control (RRC) message having information corresponding to the selected subset of D2D time resource pattern bitmaps; and
means for transmitting the RRC message to a User Equipment UE.

21. The apparatus of claim 20, wherein the RRC message includes a parameter that represents a set of permissible ones values, wherein each permissible ones value represents a count of one bits that may be present in a D2D time resource pattern bitmap selected from the predefined set of D2D time resource pattern bitmaps.

22. The apparatus of claim 20, wherein the means for selecting the subset of a predefined set of D2D time resource pattern bitmaps, the means for generating the RRC message, and the means for transmitting the RRC message are included in an evolved node B (eNB) or a portion thereof.

* * * * *

UNITED STATES PATENT AND TRADEMARK OFFICE
CERTIFICATE OF CORRECTION

PATENT NO. : 9,888,471 B2
APPLICATION NO. : 14/671315
DATED : February 6, 2018
INVENTOR(S) : Panteleev et al.

Page 1 of 1

It is certified that error appears in the above-identified patent and that said Letters Patent is hereby corrected as shown below:

In the Claims

Column 22
Lines 48-49, replace "User Equipment UE" with --UE--.

Signed and Sealed this
Tenth Day of April, 2018

Andrei Iancu
*Director of the United States Patent and Trademark Office*